United States Patent [19]

Zachery

[11] Patent Number: 5,283,887
[45] Date of Patent: Feb. 1, 1994

[54] AUTOMATIC DOCUMENT FORMAT CONVERSION IN AN ELECTRONIC MAIL SYSTEM BASED UPON USER PREFERENCE

[75] Inventor: Leon Zachery, Watertown, Mass.

[73] Assignee: Bull HN Information Systems Inc., Billerica, Mass.

[21] Appl. No.: 629,926

[22] Filed: Dec. 19, 1990

[51] Int. Cl.$^5$ .......................... G06F 5/00; G06F 13/00
[52] U.S. Cl. .............................. 395/500; 364/260.4; 364/260.81; 364/280.4; 364/284; 364/284.3; 364/DIG. 1; 364/419.1
[58] Field of Search ...................... 395/500, 275, 800; 358/440; 364/419, DIG. 1, DIG. 2

[56] References Cited

U.S. PATENT DOCUMENTS

| | | | |
|---|---|---|---|
| 5,040,142 | 8/1991 | Mori et al. | 395/275 |
| 5,109,519 | 4/1992 | Zimmet et al. | 395/800 |
| 5,115,326 | 5/1992 | Burgess et al. | 358/440 |
| 5,119,465 | 6/1992 | Jack et al. | 395/500 |
| 5,163,156 | 11/1992 | Leung et al. | 395/800 |
| 5,177,680 | 1/1993 | Tsukino et al. | 364/401 |
| 5,202,977 | 4/1993 | Pasetes, Jr. et al. | 395/500 |

Primary Examiner—Thomas C. Lee
Assistant Examiner—Maria N. Von Buhr
Attorney, Agent, or Firm—Gary D. Clapp; John S. Solakian

[57] ABSTRACT

In a data processing system having an electronic mail system for sending documents from a first user to a recipient user and, for each user, a means for creating and editing documents, the documents having differing formats, a method for converting a document having a first format into a document having a second format preferred by the recipient user, using a table of user document format preferences and a document format conversion facility. The user preference table contains, for each user, an entry specifying the document format preferred by the user, and appended to each document to be sent to a recipient user is a tag which includes a field specifying the user to receive the document, and a field specifying the first format of the document. The document format field of the tag of a received document is compared with the preferred document format field of the user preference table entry of the recipient user, and, in response to a difference between the first format and the preferred format, the document conversion facility is used to convert the document from the first format to the preferred format.

1 Claim, 1 Drawing Sheet

AUTOMATIC DOCUMENT FORMAT CONVERSION IN AN ELECTRONIC MAIL SYSTEM BASED UPON USER PREFERENCE

BACKGROUND OF THE INVENTION

1. Field of Use

The present invention pertains to electronic mail systems and, in particular, to a method for automatically converting documents from a first format into a second format preferred by a recipient.

2. Prior Art

The common use of word processing programs and electronic mail systems has resulted in a recurring problem arising from the differing document formats used by the various word processing programs.

It is frequently found that the originator of a document prefers a different word processor from that preferred by the intended recipient of the document, and that it is difficult for the recipient to read or handle the document in any meaningful manner because of the document format differences. This has been alleviated somewhat for very local communications of documents, for example, within a single department, by decreeing that all users within the department will use the same word processing program.

Decreeing a common document format is usually not feasible, over larger and more diverse groups, however, resulting in the use of document conversion utilities to convert documents from one format to another.

This general approach has not been satisfactory, however, in that the systems of the prior art have required the recipient of documents to perform a separate and individual conversion process on each document received, resulting in a substantial waste of the users time merely because of the differences between document formats.

The method of the present invention addresses this and other problems of the systems of the prior art.

OBJECTS OF THE INVENTION

It is therefore an object of the present invention to provide an improved electronic mail system whereby conversion from one document format to another format, preferred by the recipient, is performed without the recipient's intervention.

SUMMARY OF THE INVENTION

In a data processing system having an electronic mail system for sending documents from a first user to a recipient user and, for each user, a means for creating and editing documents, the documents having differing formats, a method for converting a document having a first format into a document having a second format preferred by the recipient user, using a table of user document format preferences and a document format conversion facility. The user preference table contains, for each user, an entry specifying the document format preferred by the user, and appended to each document to be sent to a recipient user is a tag which includes a field specifying the user to receive the document, and a field specifying the first format of the document. The document format field of the tag of a received document is compared with the preferred document format field of the user preference table entry of the recipient user, and, in response to a difference between the first format and the preferred format, the document conversion facility is used to convert the document from the first format to the preferred format.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

Figure 1:
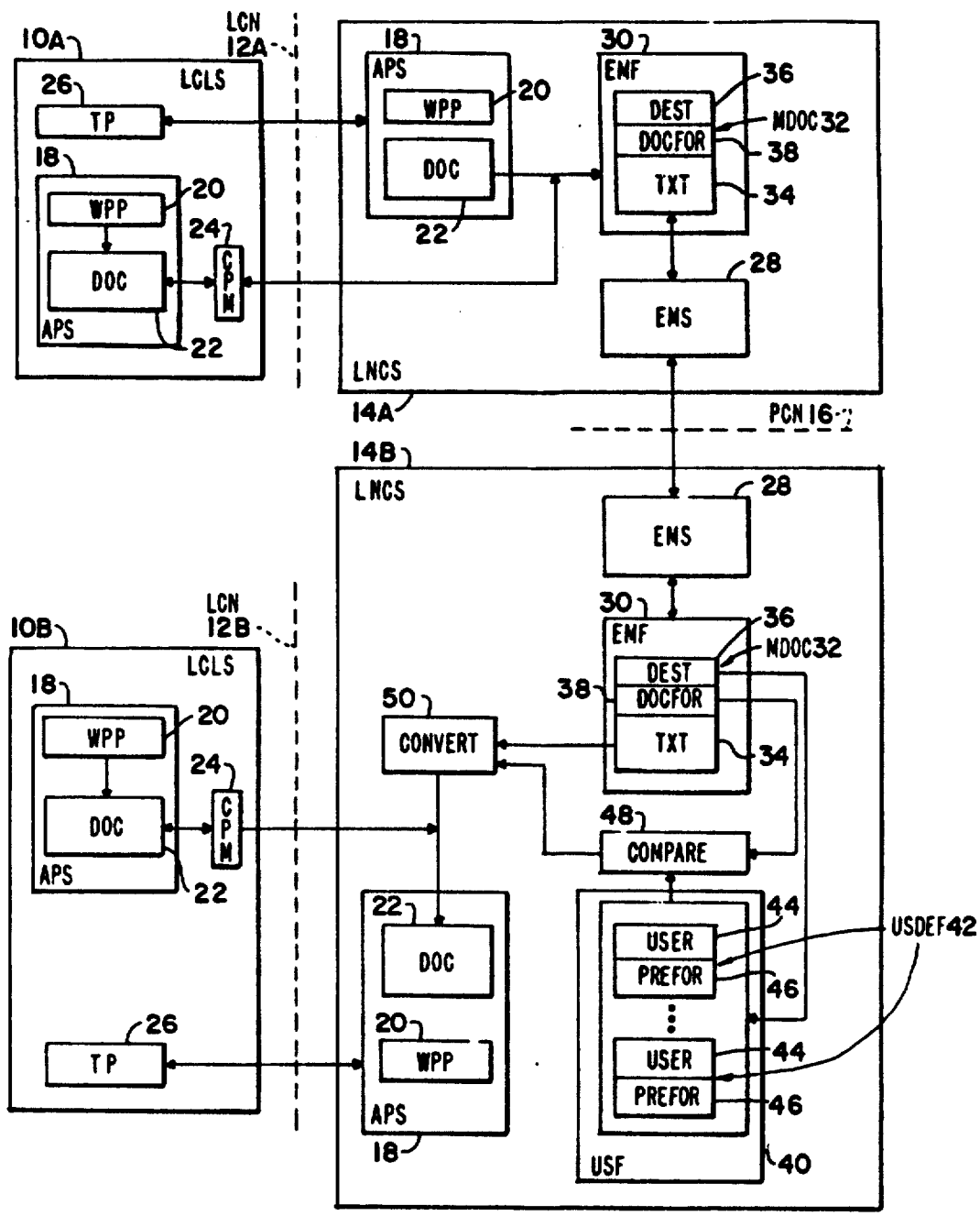
FIG. 1 is a block diagram of an exemplary system incorporating the present invention.

Referring to FIG. 1, therein is represented a block diagram of an exemplary data processing system including an electronic mail system in which the present invention may be embodied.

As shown therein, there are two users of a data processing system who wish to exchange documents through an electronic mail system incorporated into the data processing system. The first user is provided with a Local System (LCLS) 10A, such as a terminal, work station or personal computer, which is connected through a Local Communication Network (LCN) 12A to a Local Node Computer System (LNCS) 14A. The second user is similarly provided with a LCLS 10B, which may also be a terminal, work station or personal computer, which is similarly connected through a LCN 12B to a second LNCS 14B, and the two LNCSs 14 are connected through a Primary Communication Network (PCN) 16 for the exchange of electronic mail, such a documents, between the users of the two LCLSs 10.

The users of the two LCLSs 10 are each provided with a means for creating, editing or reading documents, with the specific form of their document handling capabilities being dependent upon whether each LCLS 10 is a personal computer or a workstation or a terminal and the programs available to each of the users. For example, if a given LCLS 10 is a personal computer, the user may be provided with resident Applications Programs (APS) 18, which could include a Word Processing Program (WPP) 20 capable of creating, reading and editing Documents (DOCS) 22.

In this instance, documents would be exchanged between the LCLS 10 and its associated LNCS 14 through the LCN 12 by means of a Communications Program and Communications Modem (CPM) 24, the specific implementation of which would depend upon whether the associated LCN 12 was, for example, an asynchronous data link or an Ethernet link.

It should be noted that the APS 18, including the WPP 20 and associated DOCS 22 of a given user could reside in the LNCS 14 to which the user is connected. In this instance, the user would communicate with and use these programs through Terminal Programs (TP) 26 resident in the LCLS 10. If the LCLS 10 were, for example, a personal computer or workstation, TP 26 would be comprised of terminal emulation programs, such as the VIP emulator, while, if the LCLS 10 were a terminal, the TP 26 would be comprised of the usual terminal programs.

In either case, a user, for example, of LCLS 10A and LNCS 14A could initiate the transfer of a document to the second user by invoking an Electronic Mail System (EMS) 28 resident in LNCS 14A, most probably through use of TP 26.

The general structure and operation of electronic mail systems such as EMS 28 are well known to those of ordinary skill in the art and, as such, will not be described in detail herein. EMS 28 and its associated files and family of applications programs could be, for example, a ONEPlus/ONEMail system available from Bull HN Information Systems Inc. of Billerica, Mass., which are described in Bull HN Information Systems Inc. Publication "ONEMail User Guide" HH54-003, available from Bull HN Information Systems Inc.

When a user indicates to an EMS 28 that a specified document is to be sent to a specified destination, such as the second user, EMS 28 will transfer a copy of that document into associated Electronic Mail Files (EMF) 30 as a Mail Document (MDOC) 32. The MDOC 32 will be comprised of the Text (TXT) 34 of the DOC 22 document to be mailed and a "tag", for example, as a header to the mail document file, containing a Destination field (DEST) 36 identifying the destination, or recipient such as the second user, of the document, and a Document Format field (DOCFOR) 38 specifying the format of the document, that is, whether the document is in, for example, a Multimate, Word Perfect, or Microsoft Word format.

The EMS 28 of the first users system, that is, of LNCS 14A, will then transmit the MDOC 32 to the EMS 28 of the second users system, that is, of LNCS 14B, where it will be stored in an associated EMF 30.

Referring now to LNCS 14B in further detail, each EMS 28 has associated with it a set of User Files (USF) 40 containing information pertaining to the users of the particular LNCS 14. In particular, USF 40 contains a set of User Default File Entries (USDEF) 42, each of which includes a USER field 44 identifying a particular user of the LNCS 14 and a Preferred Format field (PREFOR) 46 specifying the particular document format in which the particular user wishes to receive documents which have been sent through the electronic mail system. The USDEF 42 for a given user is usually created by the user, as a function of EMS 28, at the time the user first begins use of the system, but may be modified at any time.

As was described, upon receiving an MDOC 32 addressed to a user on the LNCS 14, for example, LNCS 14B, the resident EMS 28 places the MDOC 32 in its associated EMF 30 and reads the DEST 36 field of the "tag" to identify the particular user that the document is addressed to.

The EMS 28 then uses that user identification to locate the appropriate USDEF 42 entry for that user, through the USER 44 field, and reads the PREFOR 46 field of the USDEF 42. The preferred format read from the PREFOR 46 field is compared to the document format identified in the DOCFOR field 38 of the MDOC by the EMS 28s COMPARE 48 function.

If the recipient's preferred format and the received documents format are different, COMPARE 48 generates an output to a document format conversion program, CONVERT 50, indicating the necessary conversion to place the received document into the format preferred by the recipient. CONVERT 50 will read the TXT 34 of the MDOC 32 and will write a document file containing the appropriately converted text of the received document, that is, of TXT 34, into a DOC 22 file of the recipient.

If the received and preferred formats are the same, the received document will be written directly into the word processing files of the recipient. Alternately, if the conversion cannot be performed within the capabilities of CONVERT 50, the recipient user may invoke EMS 28 directly and perform a conversion under the users direct control.

CONVERT 50 may be any of, or similar to, any of the presently available commercial document format conversion utilities, all of which are well known to those of ordinary skill in the art.

As was described, the recipient's word processing program may reside in either the associated LNCS 14 or in the users LCLS 10. EMS 28 will cause the converted document to be written into either, as appropriate for the user and in the same, but inverse, manner as a document would be provided from the user's word processing files to the EMS 10.

Finally, it should be noted that while the document conversion process comprising USDEFs 42, COMPARE 48 and CONVERT 50 has been described with reference only to LNCS 14B, a similar facility for document conversions will exist in LNCS 14A, so that documents sent, for example, from the second user to the first user, may be similarly converted to the format preferred by the first user.

While the invention has been particularly shown and described with reference to a preferred embodiment of the method thereof, it will be understood by those of ordinary skill in the art that various changes in form, details and implementation may be made therein without departing from the spirit and scope of the invention as defined by the appended claims.

What is claimed is:

1. In a data processing system having a first local node and a second local node, wherein there is a first user connected from the first local node and having a means for creating and editing documents and a plurality of second user connected from the second local node and having a means for creating and editing documents, and an electronic mail system having a first part residing in the first local node and a second part residing in the second local node and the first and second parts of the electronic mail system being connected between the first local node and the second local node for sending documents from the first user to a second user wherein the documents have differing formats, a method for converting a document sent from the first user to the second user and having a first format into a document having a second format preferred by the second user, comprising the steps of:

in the second local node, storing a table of user document format preferences, the user preference table containing, for each second user, an entry containing an identification of the document format preferred by the user, the entry being modifiable by the user:

in the first local node and responsive to a command by the first user to send a document having a first format to the second user, appending a tag to the document to be sent to the second user, the tag including a field containing an identification of the second user, and a field containing an identification of the first format of the document;

in the first part of the electronic mail system in the first local node and responsive to a command by the first user to send the document to the second user, sending the document to the second part of the electronic mail system in the second local node;

in the second local node,
- receiving and storing the document received from the first part of the electronic mail system in an electronic mail file of the second part of the electronic mail system;
- reading the identification of the second user from the tag appended to the document;
- reading the identification of the first format of the document from the tag appended to the document;
- responsive to the identification of the second user from the tag appended to the document,
  - reading from the user preference table the identification of the document format preferred by the second user;
- comparing the identification of the first format of the document and the identification of the document format preferred by the second user; and in the second local node,
- when the identification of the first format of the document is different from the identification of the document format preferred by the second user,
  - invoking a document conversion facility; and,
  - by operation of the document conversion facility, converting the document from the first format to the document format preferred by the second user.

* * * * *